Sept. 18, 1923.  H. A. LAYSTROM  1,468,161

BICYCLE STAND

Original Filed April 16, 1921

Witnesses:

Inventor:
Hilding A. Laystrom
By Joshua R. H. Potts
His Attorney

Patented Sept. 18, 1923.

1,468,161

UNITED STATES PATENT OFFICE.

HILDING A. LAYSTROM, OF CHICAGO, ILLINOIS.

BICYCLE STAND.

Original application filed April 16, 1921, Serial No. 462,003. Divided and this application filed June 5, 1922. Serial No. 565,904.

*To all whom it may concern:*

Be it known that I, HILDING A. LAYSTROM, a citizen of the United States, and a resident of the city of Chicago, county of Cook, and State of Illinois, have invented certain new and useful Improvements in Bicycle Stands, of which the following is a specification.

My invention relates to improvements in bicycle stands and has for its main object the provision of a strong and efficient stand in which the weight of the bicycle will be placed directly upon vertical stand bars, without transferring said weight through attaching brackets or plates, or through pivoted pins or ears on said plates.

Another object is to provide a stand which remains securely in operative position and cannot be forced either backward or forward without lifting the bicycle, and which stand may be set in suspended position without the use of any additional suspending member.

Another object is to provide a stand which may be readily locked in operative or standing position.

Another object is to place and lock the supporting stand in direct contact with the axle nuts in order that neither said nuts nor the bracket plates may be removed while the stand is locked in operative position.

Other objects will appear hereinafter.

This application is a division of my prior application filed April 16, 1921, Serial No. 462,003.

The invention consists in the combinations and arrangements of parts hereinafter described and claimed.

Figure 1:
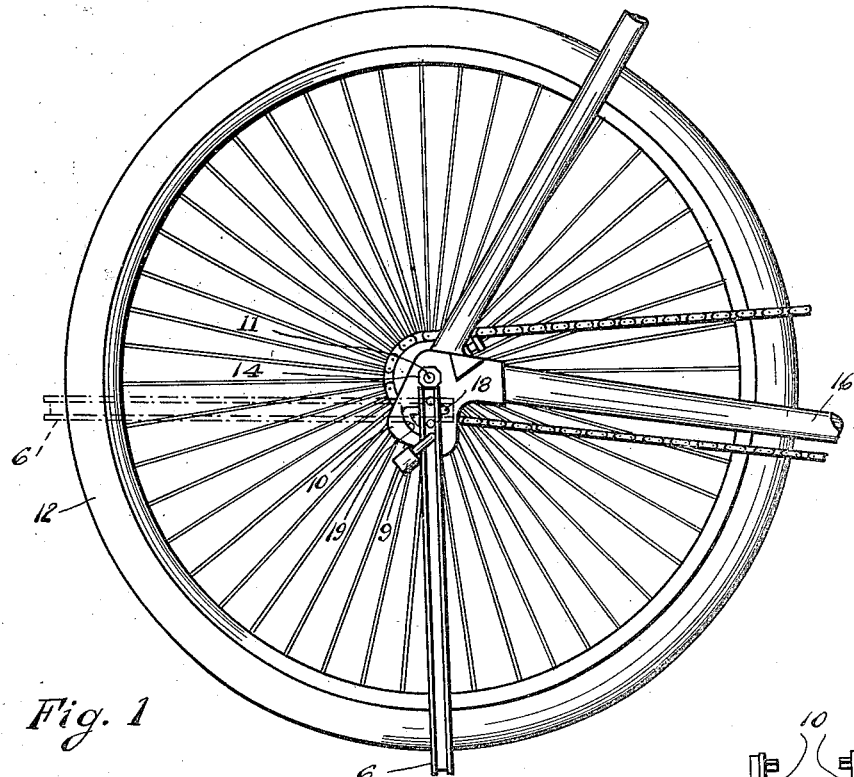
Figure 2:
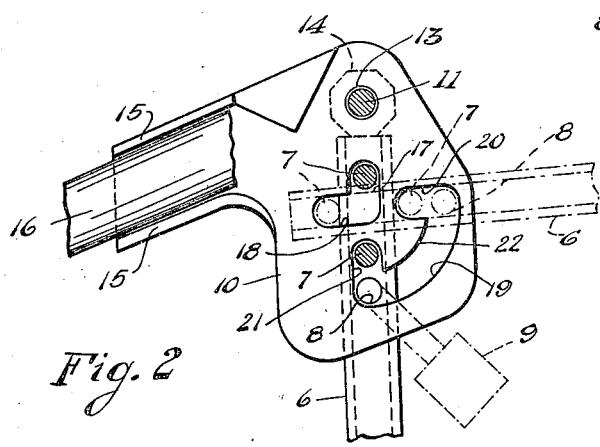
Figure 3:
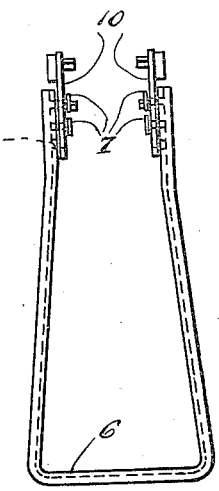

The invention will be best understood by reference to the accompanying drawings forming a part of this specification, and in which, Fig. 1, is a side elevation showing my invention applied to the rear axle and bar of the bicycle, Fig. 2, is an enlarged fragmentary view of the connections between the stand bars, the supporting plates, and the frame bars, and Fig. 3, is a view of the bicycle stand.

My bicycle stand comprises a U-shaped channel iron frame bar or supporting member 6 provided with a pair of attaching pins 7 at each of its ends, and a lock opening 8 beneath said pins for receiving a suitable padlock 9.

A pair of attaching plates 10 are mounted on the ends of the rear axle 11 of a bicycle 12 by means of openings 13 in said plates, and are held on said axle by axle nuts 14, each plate being provided with a pair of ears or wings 15, which embrace the horizontal bars 16 of the bicycle. Each attaching plate is further provided with an L-shaped upper slot having a vertical portion 17 and a lower horizontal portion 18, and a lower curved slot 19 which has an upper horizontal portion 20 and a lower vertical portion 21 which form a double pointed lug 22 extending into the slot 19, the points of said lug serving to seat and hold the pins securely against movement.

The full lines show the support 6 in an operative position with the two top ends of said support bearing directly under the rear axle nuts 14, and the pins 7 engaging in the vertical portions 17 and 21 of said slots, and the dotted lines show the inoperative position in which the support is held elevated or suspended by the pins 7 engaging in the horizontal portions 18 and 20 of the L-shaped and the curved slots respectively. The stand is locked in its operative position by fastening the padlock 9 through the slot 19 in the plate and through the opening 8 in the frame bar, which prevents the plate from being moved upwards on the pins 7 of said frame bar, thus retaining said pins in the upper vertical portion of said slots.

By the arrangement of the pins and slots, as set forth above, the supporting or frame member will remain in its vertical or operative position and cannot be forced either forward or backward until the rear wheel is lifted up sufficiently to drop the pins in the lower portions of the slots, whereupon the supporting member may be kicked back, raised horizontally, then shoved forward, so that the pins engage in the forward ends of the horizontal portions of the slots, thus retaining the frame or supporting member suspended without additional suspending means. To drop the supporting member it is merely necessary to pull it back and let it fall down, at the same time raising the rear wheel sufficiently to let the lower pins enter the lower portions of the slots, whereupon the device automatically assumes the operative position and may be locked in said position by inserting the padlock through the openings 8 and 19, as stated above.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:

1. A bicycle stand comprising an attaching bracket having an opening for mounting the bracket on the bicycle axle adjacent the axle nut and being provided with two separate slots; and a supporting member having a pair of pins engaging in said slots, by means of which said supporting member may be held in either a suspended position or in an operative position with said stand engaging beneath said axle nut.

2. A bicycle stand comprising attaching brackets, each of said brackets being provided with a plurality of slots and having means to embrace a bicycle bar; a supporting member having arms; pins on the ends of said arms to engage in said slots, said slots having parts to receive said pins and retain said members suspended and parts to receive said pins and retain said member in a supporting position.

3. A bicycle stand comprising an attaching bracket having means for engaging a part of said bicycle and being provided with an opening for engaging the bicycle axle and with separate slots, one of which is curved; and a supporting member having a plurality of pins, one engaging in each slot, by means of which said supporting member may be held in either an operative or an inoperative position.

4. A bicycle stand provided with a pair of brackets, each of said brackets being provided with an axle engaging opening and a plurality of slots and having ears to embrace the adjacent bicycle bar; a supporting frame provided with arms; pins adjacent the end of each of said arms; and means to lock said supporting frame in its operative position in said brackets.

5. A bicycle stand comprising a pair of attaching brackets having each a pair of ears to embrace a bicycle bar; an L-shaped slot and a curved slot in each of said brackets; a vertical and a horizontal part on each of said curved slots; a U-shaped supporting member having pins adjacent each end for engaging in said slots, by means of which said supporting member may be held in either an operative or a suspended position.

6. A bicycle stand comprising a pair of similar attaching brackets, each having means for mounting it on a bicycle bar; a pair of irregular slots in each bracket, one of said slots being curved forming a lug provided with a plurality of points extending into said slot; and a supporting member having arms, each to engage one of said brackets, there being a pair of pins on each arm movable into different parts of said slots, one of each pair engaging behind the points on said lug to retain said frame either in its operative or inoperative position.

7. A bicycle stand comprising an attaching bracket mountable on a bicycle and being provided with an opening for embracing the bicycle axle and with a plurality of separate irregular slots; and a supporting member having a plurality of pins engaging in said slots by means of which said supporting member may be held in a suspended or a ground engaging position.

In testimony whereof I have signed my name to this specification in the presence of two subscribing witnesses.

HILDING A. LAYSTROM.

Witnesses:
  FREDA C. APPLETON,
  MARGARET AUER.